United States Patent [19]
Nakagami

[11] Patent Number: 5,384,445
[45] Date of Patent: Jan. 24, 1995

[54] STUD WELDING GUN

[75] Inventor: Eiji Nakagami, Aichi, Japan

[73] Assignee: Emhart Inc., Newark, Del.

[21] Appl. No.: 106,479

[22] Filed: Aug. 13, 1993

[30] Foreign Application Priority Data

Aug. 24, 1992 [JP] Japan .................. 4-059174

[51] Int. Cl.6 .................................. B23K 9/20
[52] U.S. Cl. .................................... 219/98
[58] Field of Search ......................... 219/98, 99

[56] References Cited

U.S. PATENT DOCUMENTS

| 4,019,013 | 4/1977 | Spisak | 219/98 |
| 5,067,632 | 11/1991 | Aubry | 221/266 |
| 5,068,511 | 11/1991 | Meyer, Sr. | 219/98 |

*Primary Examiner*—Clifford C. Shaw
*Attorney, Agent, or Firm*—Edward D. Murphy

[57] ABSTRACT

A stud welding gun 1 has a collet 4 to hold a stud, a piston to push a stud out to the collet, and a feed pipe to automatically feed studs one by one. A stud receiving member 15 to receive and store studs is provided between the collet and the stud feed pipe and the stud receiving member is provided with at least two stud receivers 16. Each stud receiver is capable of moving between a first position in which it receives a stud and a second position which continues to the collet and in which a stud pushed out by the piston is held by the collet, and when a stud receiver 16 is in the second position, another stud receiver is in the first position. By this, the receiving of a stud is carried out simultaneously with the loading of a stud to reduce the working time.

1 Claim, 1 Drawing Sheet

STUD WELDING GUN

BACKGROUND

1. Field of Invention

The present invention relates to a stud welding gun, and particularly to a stud welding gun of the type in which studs are automatically fed to the collet of the welding gun.

2. Prior Art

The stud welding gun having a collet to hold a stud, a piston to push a stud out to the collet and a feed pipe to automatically feed studs one by one is well known and used widely in automatic stud welding.

Since the above-mentioned stud welding gun feeds studs automatically, the operation to load the collet with studs is not needed and this reduces the length of time required for stud welding compared to the conventional type in which studs are fed manually. Nevertheless, it needs time from the arrival of a fed stud at the welding gun to the loading of it on the collet as a stud is received by a stud receiving member and thereafter the piston is activated to push the stud out to the collet for loading.

Accordingly, the present invention aims to reduce the working time with the automatic feeding type stud welding gun.

SUMMARY

In order to achieve the above-described object, according to the present invention, there is provided a stud welding gun having a collet to hold a stud, a piston to push a stud out and a feed pipe to automatically feed studs one by one, characterized in that a stud receiving member to receive and store studs is provided between the collet and the stud feed pipe, and the receiving member is formed with at least two stud receivers, the stud receivers capable of moving between a first position in which each stud receiver receives a stud and a second position which communicates with the collet and in which a stud pushed out by the piston is held by the collet, one of the stud receivers staying in the first position while another stud receiver is in the second position.

DESCRIPTION OF A PREFERRED EMBODIMENT

Figure 1:
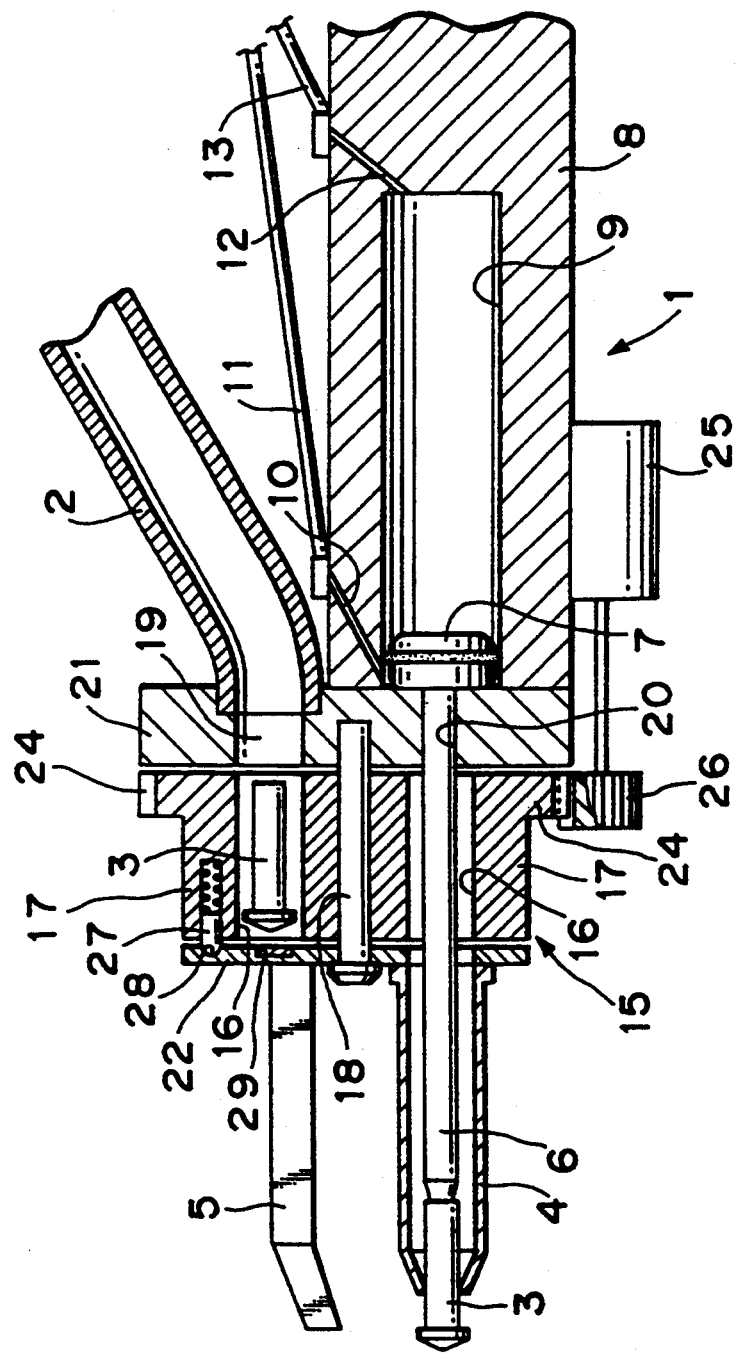
FIG. 1 is a vertical sectional view of a stud welding gun according to the present invention.

The present invention is described further by way of an embodiment, with reference to an accompanying drawing. In FIG. 1, to a stud welding gun 1 a stud feed pipe 2 extending from an automatic stud feeder (not illustrated) is connected and the welding gun 1 welds a stud 3 fed to it to a base material. The stud welding gun 1 comprises a collet 4 which holds the stud 3, with the weld portion of the stud projecting therefrom, and presses it onto the base material; a reference stick which extends in parallel with the collet toward the end of the collet and keeps a predetermined interval between the stud and the base material so that a proper arc discharge can be produced between them; a piston rod which extends inside the collet 4 toward the end of the collet 4 and pushes the stud 3 out to the end of the collect 4; a cylinder 9 formed in a housing 8 and behind the piston rod 6 so as to receive the piston 7; a hole 10 formed on the front end side of the cylinder 9; a pipe 11 connected to this hole: a hole 12 formed on the rear end side of the cylinder 9; and a pipe 13 connected to this hole. When pressurized air is supplied to the pipe 13, the pressurize air gets out from the rear end side of the cylinder 9 to push the piston 7 forward to the illustrated position and the stud 3 is pressed out toward the end side of the collet 4. On the contrary, when pressurized air is supplied to the pipe 11, the pressurized air gets out from the front end side of the cylinder 9 to return the piston 7 backward to its stand-by position. Although not illustrated, as commonly known, power for discharge is supplied from the power source to the collet 4 and an electrode from the power source for grounding is connected to a portion of the base material to which a stud is welded.

According to the present invention, a stud receiving member 15 to receive and store studs is provided between the rear side of the collet 4 and the stud feed pipe 2. In the illustrated embodiment, the stud receiving member 15 has a drum 17 formed with a plurality of cylindrical stud receivers 16 arranged at equal distances from each other circumferentially; a shaft 18 rotatably supporting the drum 17; a supporting member 21 which supports the root of the shaft 18 and the stud feed pipe 2 and is formed with a passage 19 for feeding studs to the stud receivers 16 of the drum 17 and with a hole 20 for the piston rod 6 to extend out to the collet 4; and a holding plate 22 which is provided oppositely to the supporting member 21 and holds the drum 17 sandwiched between the supporting member and the holding plate. A toothed wheel 24 is provided on the rear end side periphery of the drum 17. A toothed wheel 26 extending from a motor 25 mounted on the housing 8 meshes with the toothed wheel 24 and the drum 17 is rotated when the motor is energized. Accordingly, each stud receiver 16 is capable of moving between a first position in which it receives a stud (i.e., the position where it meets the passage 19) and a second position which communicates with the collet 4 and in which a stud pushed out by the piston rod 6 is held by the collet 3 (i.e., the position where it meets the hole 20). Relative positions of the stud receivers 16 are set so that a stud receiver is in the first position while another receiver is in the second position. The number of the stud receivers 16 is optional as long as there are at least two of them. In the drum 17, a stopper pin 27 is resiliently biased so as to come into contact with the holding plate 22, and the holding plate 22 is formed with a concave 28 with which the stopper pin 27 engages so that a stud receiver can be in the first position while another stud receiver is in the second position. The stud receiving member 16 is provided with a sensor 29 to detect a stud.

The stud welding gun 1 of the above-described structure functions as follows. The stud 3 fed from the stud feed pipe 2 moves through the passage 19 of the supporting member 21 and is received by the stud receiver 16 in the first position. When the sensor 29 detects the stud 3, the motor 25 is driven and the rotation of the toothed wheels 26 and 24 rotates the drum 17. With this, the stud receiver 16 containing the stud 3 moves to the second position to be in alignment with the collet 4. Pressurized air is supplied from the pipe 13 to the cylinder 9 to push the piston 7 and the piston rod 6 pushes the stud 3 in the stud receiver 16 out to the collet 4. While the collet is thus loaded with the stud, the other stud receiver in the first position receives a stud fed from the stud feed pipe 2. Upon completion of welding, pressurized air supplied from the pipe 11 causes the piston 7 to recede and the drum 17 is rotated so that the collet 4 is loaded with a new stud and a next stud is received by a stud receiver 16. This cycle of actions is repeated for each welding.

In the illustrated embodiment, a rotary drum is used to carry out the loading of the collet with a stud simultaneously with the receiving of a stud by a stud receiver. The structure is not limited to this, however, as long as a plurality of stud receivers are provided, each stud receiver capable of moving between the first position in which it receives a stud and the second position which communicates with the collet and in which a stud pushed out by the piston is held by the collet, and a stud receiver is in the first position when another stud is in the second position. For example, a structure in which stud receivers slide between the first and the second positions will do.

Advantageous Effect of the Invention

In the stud welding gun according to the present invention, a stud receiving member to receive and store studs is provided between the collet and the stud feed pipe and the stud receiving member is formed with at least two stud receivers. Each of the stud receivers is capable of moving between a first position in which it receives a stud and a second position which communicates with the collet and in which a stud pushed out by the piston is held by the collet, and when a stud receiver is in the second position, another stud receiver is in the first position. Therefore, a stud is received by the stud receiving member simultaneously while another stud is pushed out to be loaded on the collet, remarkably reducing the time between the feeding of a stud to the stud welding gun and the loading of it on the collet. Accordingly, the working time with the automatic feed type stud welding gun is shortened.

I claim:

1. A stud welding gun having a collet to hold a stud in a position at which the stud is welded to a base material, a piston to load a stud into the collet for welding thereof, and a feed pipe to automatically feed studs one by one, characterized in that a stud receiving member to receive and store studs is provided between the collet and the stud feed pipe, and said receiving member is formed with at least two stud receivers, the stud receivers being capable of moving between a first position in which each stud receiver receives a stud and a second position which communicates with the collet and in which a stud is pushed out by the piston and loaded into the collet, one of the stud receivers staying in the first position while another stud receiver is in the second position.

* * * * *